United States Patent
Lin et al.

(10) Patent No.: US 10,068,620 B1
(45) Date of Patent: Sep. 4, 2018

(54) AFFECTIVE SOUND AUGMENTATION FOR AUTOMOTIVE APPLICATIONS

(71) Applicant: LP-RESEARCH INC., Tokyo (JP)

(72) Inventors: Zhuohua Lin, Tokyo (JP); Klaus Petersen, Tokyo (JP); Tobias Schlüter, Tokyo (JP); Huei Ee Yap, Tokyo (JP)

(73) Assignee: LP-Research Inc., Tokyo (JP)

( * ) Notice: Subject to any disclaimer, the term of this patent is extended or adjusted under 35 U.S.C. 154(b) by 0 days.

(21) Appl. No.: 15/627,985

(22) Filed: Jun. 20, 2017

(51) Int. Cl.
  *G11B 33/10* (2006.01)
  *H04B 1/00* (2006.01)
  *G11B 31/00* (2006.01)

(52) U.S. Cl.
  CPC .............. *G11B 33/10* (2013.01); *G11B 31/00* (2013.01); *H04B 1/0007* (2013.01)

(58) Field of Classification Search
  None
  See application file for complete search history.

(56) References Cited

U.S. PATENT DOCUMENTS

| | | | |
|---|---|---|---|
| 5,304,112 A | 4/1994 | Mrklas et al. | |
| 5,574,641 A | 11/1996 | Kawakami et al. | |
| 5,844,992 A | 12/1998 | Boyer | |
| 7,431,120 B2 | 10/2008 | Pollehn et al. | |
| 7,821,382 B2 | 10/2010 | Kameyama | |
| 8,320,581 B2 | 11/2012 | Hera et al. | |
| 9,573,523 B2 * | 2/2017 | Di Censo | B60Q 9/008 |
| 2002/0041692 A1 | 4/2002 | Seto et al. | |
| 2003/0220722 A1 | 11/2003 | Toba et al. | |
| 2006/0283652 A1 | 12/2006 | Yanai et al. | |
| 2007/0066916 A1 | 3/2007 | Lemos | |
| 2008/0202323 A1 | 8/2008 | Isozaki et al. | |
| 2009/0160631 A1 | 6/2009 | Galley et al. | |
| 2010/0134302 A1 | 6/2010 | Ahn et al. | |
| 2010/0246843 A1 * | 9/2010 | Palmestal | G10K 15/02 381/61 |
| 2014/0211962 A1 * | 7/2014 | Davis | G10K 11/1788 381/86 |

(Continued)

FOREIGN PATENT DOCUMENTS

| | | |
|---|---|---|
| DE | 10152852 A1 | 5/2003 |
| DE | 102007003201 A1 | 5/2008 |

(Continued)

OTHER PUBLICATIONS

NVISO, Insights for Market Researchers, http://www.nviso.ch/, printed Sep. 27, 2017, copyright 2016.

(Continued)

*Primary Examiner* — Paul Huber
(74) *Attorney, Agent, or Firm* — Erise IP, P.A.

(57) ABSTRACT

In order to affect the mood of a vehicle operator (for example, to increase attentiveness), embodiments of the invention automatically sequence appropriate audio cues into the sound playback from a vehicle's sound system. These cues represent events related to the vehicle or taking place in the vicinity of the vehicle, and can be modulated or effected so as to better convey the vehicle event. These cues may also be part of a coherent soundscape representing a fantasy scenario, such as motocross, sailing, or stand-up paddle boarding. Both the soundscape and the mapping of vehicle events to sound cues are configurable by the user.

19 Claims, 3 Drawing Sheets

(56) References Cited

U.S. PATENT DOCUMENTS

| | | |
|---|---|---|
| 2015/0053066 A1 | 2/2015 | Hampiholi et al. |
| 2015/0199955 A1* | 7/2015 | Draganic ............... G10K 15/02 381/86 |
| 2015/0254955 A1 | 9/2015 | Fields et al. |
| 2016/0089954 A1 | 3/2016 | Rojas Villanueva |

FOREIGN PATENT DOCUMENTS

| | | |
|---|---|---|
| DE | 102013017582 A1 | 4/2014 |
| EP | 0963052 A2 | 8/1999 |
| EP | 1291226 A2 | 3/2003 |
| EP | 2608153 A1 | 6/2013 |
| JP | 11-288291 | 10/1999 |
| WO | 9013109 A1 | 11/1990 |
| WO | 2014085302 A1 | 6/2014 |

OTHER PUBLICATIONS

Affectiva, "Emotion AI Overview What is it and how does it work?" printed Sep. 27, 2017 copyright 2017.
Ahtisaari, Marko, et al., "If Scent Has a Hotline to Memory, It Seems Music Has a Hotline to Emotion," Sync Project, http://syncproject.co/blog/2015/7/21/music-and-emotion, Jul. 21, 2015.
PCT Patent Application No. PCT/IB2017/053672 International Search Report and Written Opinion dated Sep. 12, 2017.

* cited by examiner

AFFECTIVE SOUND AUGMENTATION FOR AUTOMOTIVE APPLICATIONS

BACKGROUND

1. Field

Embodiments of the invention generally relate to in-vehicle audio and, more particularly, to adaptively providing supplemental sounds to enhance drivers' and passengers' awareness of their vehicle's surroundings.

2. Related Art

Traditionally, in-vehicle audio has been unrelated to the ambient conditions of the vehicle. For example, the vehicle's sound system may play music or other entertainment for the driver and/or passengers. More recently, some automotive manufacturers have begun using the vehicle's sound system to augment or otherwise make engine sounds audible in the passenger compartment. On the other hand, electric vehicles lack a conventional engine and, as such, may fail to provide the driver with the cues needed to maintain a proper level of attentiveness for vehicle operation.

What is needed, therefore, is a system for adaptively augmenting in-vehicle audio to enhance drivers' and passengers' awareness of their vehicle's surroundings or otherwise affect their moods. For example, a drowsy driver may be rendered more alert or a stressed driver may be calmed by the use of an appropriate soundscape. This augmented audio can correspond to simulated vehicle sounds or to an artificially produced fantasy driving soundscape incorporating background sounds and sound cues corresponding to particular events occurring around the vehicle.

SUMMARY

Embodiments of the invention address the above-described need by providing for acoustic enhancement of in-vehicle audio to enhance drivers' and passengers' awareness of their vehicle's surroundings. In particular, in a first embodiment, the invention includes a system for providing contextual enhancement of audio in a vehicle, comprising one or more vehicle sensors configured to provide sensor data relevant to the vehicle, a processor, one or more computer-storage media storing computer-executable instructions that, when executed by the processor perform steps of determining a vehicle event based on the sensor data, determining an audio cue based on the vehicle event and a mapping of a plurality of vehicle events to a corresponding plurality of sound cues, applying a modulation to the sound cue based on the sensor data, an in-vehicle sound system, programmed to mix the modulated sound cue into a background track and play the mixed sound over in-vehicle speakers.

In a second embodiment, the invention includes one or more computer-storage media storing computer-executable instructions that, when execute, perform a method of providing contextual enhancement of audio in a vehicle, the method comprising the steps of determining a soundscape of a plurality of available soundscapes, receiving, from a vehicle sensor, sensor data, determining a vehicle event based on the sensor data, determining a sound cue based on the vehicle event and the determined soundscape, modulating the sound cue based on the sensor data, and mixing the modulated sound cue into the soundscape for playback.

In a third embodiment, the invention includes a method of providing contextual enhancement of audio in a vehicle comprising the steps of receiving, from a user, a selection of a soundscape of a plurality of soundscapes, receiving, from the user, an indication of a mapping from a vehicle event of a plurality of vehicle events to a sound cue of a plurality of sound cues, playing a background track of the soundscape, receiving, from a vehicle sensor, sensor data, determining based on the sensor data, that the vehicle event has occurred or is occurring, modulating the sound cue based on the sensor data, and mixing the modulated sound cue into the background track of the soundscape.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
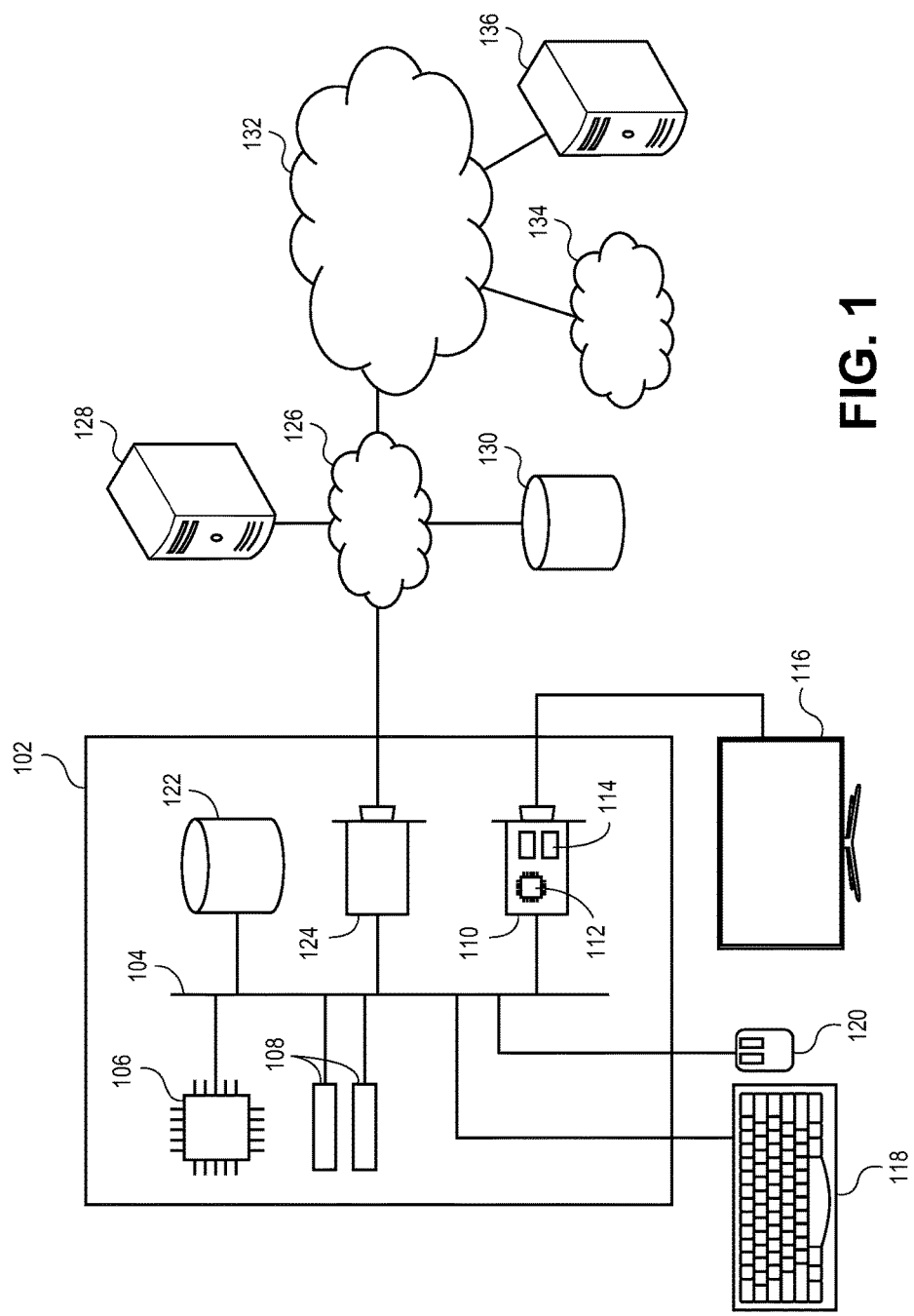
FIG. 1 depicts an exemplary hardware platform for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

At a high level, embodiments of the invention automatically sequence appropriate audio cues into the sound playback from a vehicle's sound system. These cues represent events related to the vehicle or taking place in the vicinity of the vehicle, such as slow speed changes, sudden braking or acceleration, location changes or a variety of other events. These sound cues may be represented by pre-recorded sound samples of audio from a variety of scenarios and can be adjusted (for example, by altering the playback speed or pitch) based on feedback from sensors attached to the vehicle and various effects (such as, for example, echo or looping) can be added.

Broadly speaking, sound cues correspond to vehicle events detected based on ambient conditions. These vehicle events can be user-defined or pre-programmed into the system. The determination of which sound cue is mapped to which vehicle event can also be customized by the user or selected from a set of pre-determined mappings. A variety of soundscapes, with associated sets of sound cues, may be made available to the user and the soundscape for a particular trip can be automatically determined or user-selected.

The subject matter of embodiments of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be obvious to one skilled in the art, and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments, but is not necessarily included. Thus, the technology can include a variety of combinations and/or integrations of the embodiments described herein.

Turning first to FIG. 1, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules. Also attached to system bus 104 is graphics card 110. In some embodiments, graphics card 104 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removeably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 2:
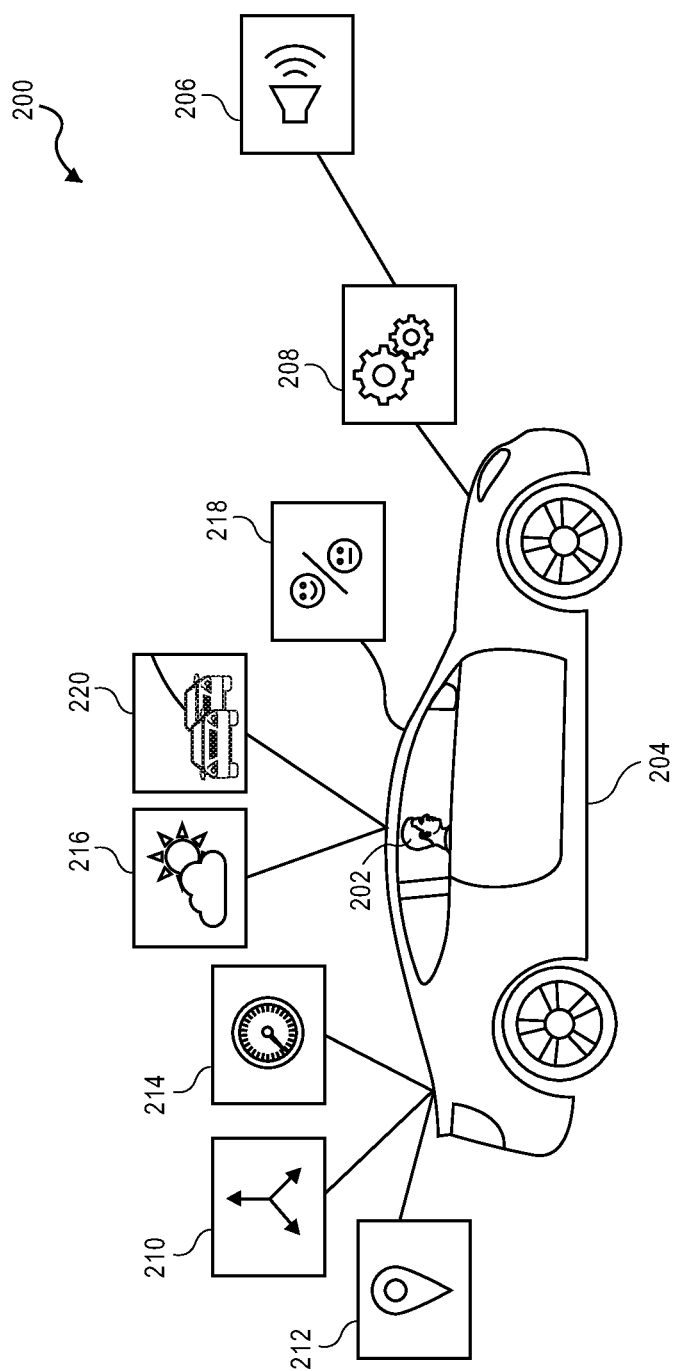
FIG. 2 depicts a block diagram depicting certain components of a system embodying the invention.

Turning now to FIG. 2, a block diagram showing certain components of an environment suitable for practicing embodiments of the invention is depicted and referred to generally by reference numeral 200. As depicted, user 202 is operating vehicle 204. Vehicle 204 is one example of a platform suitable for embodiments of the invention. For example, vehicle 204 may be a car, truck, sport utility vehicle, or any other form of transportation. In some embodiments, vehicle 204 may instead be an airplane, train, boat, or other method of transportation. Broadly speaking, any form of public or private conveyance is contemplated as being within the scope of the invention. Vehicle 204 may be a conventional (driver-operated) vehicle, or an autonomous (self-driving) vehicle, or a hybrid of the two (for example, a partially autonomous vehicle requiring a driver presence but only limited activity or supervision).

Vehicle 204 has one or more occupants such as user 202. In some embodiments, user 202 may be a driver or a passenger of vehicle 204. In some embodiments, vehicle 204 is autonomous or partially autonomous (and therefore has no driver). In some embodiments, vehicle 204 has no passengers. In other embodiments, vehicle 204 has a plurality of passengers. Broadly speaking, embodiments of the invention can be used whenever vehicle 204 has at least one occupant of any type to serve as user 202. In some embodiments, an occupant of vehicle 204 may be user 202 at a first point in time during a trip and a different occupant at a later point in time. Similarly, in embodiments where multiple occupants can simultaneously be user 202, an occupant may be in the group of users 202 at a first point in time, leave the group of users 202 at a second point in time, and rejoin the group of users 202 at a third point in time. For example, where vehicle 204 is a partially autonomous vehicle, the attention of an occupant designated as driver may be required for some (e.g., the non-highway portion) of a drive. In such a case, the driver can be a member of the group of users 202 during the highway portions of the drive and drop out of the group when their attention is required for driving vehicle 204. For the sake of brevity, the term "user" will be employed herein; however, embodiments of the invention contemplate a plurality of users in addition to a single user.

As depicted, vehicle 204 includes a sound system 206 controlled by sequencer 208. In some embodiments, sound system 206 plays audio entertainment (such as, for example, music) for user 202. In other embodiments, sound system 206 plays an audio component of multimedia entertainment (such as, for example, movies or video games) for user 202. In still other embodiments, sound system 206 augments the soundscape of vehicle 204 by providing or enhancing ambient sounds (such as, for example, engine growl or wind/rain sounds). One of skill in the art will appreciate that the same sound system 206 may be employed for all of these applications individually or in combination as controlled by sequencer 208. In some embodiments, sequencer 208 may control multiple sound systems 206. For example, a front seat sound system 206 may provide music to a first user 202, while a rear seat sound system 206 provides the audio component of a movie to another user 202. As described in greater detail below, the same or different sound cues can be mixed into each sound system 206.

Broadly speaking, sequencer 208 controls sound system 206. Sequencer 208 may receive an analog or digital audio signal from one or more other audio components, such as an AM, FM, or Satellite radio receiver, a CD or tape player, a digital audio file player, or auxiliary input jack. Alternatively, sequencer 208 may receive an audio or composite signal from a multimedia source such as a movie player or video game console. In some embodiments, sequencer 208 also functions as an input multiplexer, receiving audio signals from some or all of the above-described sources and selecting one (or mixing two or more) based on user input. In other embodiments, a separate switcher or mixer provides a single input to sequencer 208.

It is a function of sequencer 208 to insert sound cues into the audio output of sound system 206 in order to affect the mood, attention, or emotional state of user 202 based on environmental or user cues. The sound cues may also be modulated (for example, by changing the pitch, tempo, and/or volume) and effects (for example, echoes or looping) may be added. The sound cues added may be determined based on a user-selected scenario or soundscape, and the precise modulations and effects applied to the sound cues may be altered based on input from the various sensors described below.

In order to determine and modulate sound cues appropriately, embodiments of the invention include one or more sources of data relating to current or future ambient phenomena. For example, in some embodiments, the invention includes one or more accelerometers 210 for determining current automotive motion. In other embodiments, acceleration data is instead gathered via location-determining component 212 (such as a Global Positioning System receiver). Similarly, other sensors can collect data on other ambient phenomena in order to add appropriate cues. For example, a light sensor could determine the current light levels to determine a simulated time-of-day for the sound cue. Broadly speaking, any form of sensors or transceiver is contemplated as being usable to augment the soundscape of vehicle 204 with appropriate sound cues.

As yet another source of information about current and future ambient phenomena, some embodiments of the invention may integrate with vehicle controls and instruments 214. In some embodiments, data from vehicle controls and instruments 214 is used to provide data about upcoming movements of the vehicle over a short time horizon. As a first example, different sound cues may be provided based on the current speed of vehicle 204. Embodiments of the invention can use information from the car's instruments (here, the speedometer or related component) to determine the current speed and select the appropriate sound cue. Alternatively, information on vehicle movements can be collected directly from the controls of vehicle 204. For example, if a driver of vehicle 204 steps on the accelerator, embodiments of the invention can begin to incorporate appropriate sound cues even before accelerometer 210 can detect the resultant acceleration.

In some embodiments, information from sources other than the vehicle itself can also be used to select appropriate sound cues. For the sake of brevity, these information sources are also referred to herein as "sensors." For example, weather data 216 in the vicinity of vehicle 204 can be retrieved using a wireless (e.g., cellular) connection to Internet 132. If the current weather is sunny, then a beach soundscape (for example, a jet-ski or surfing scene) might be selected. By contrast, if the current weather includes rain and thunder, then a historical sailing soundscape might be selected, and if it is nighttime, then a muscle car soundscape might be selected.

In addition to weather data, mood data for user 202 and/or one or more other occupants of vehicle 204 can be used to determine an appropriate soundscape and select sound cues. For example, vehicle 204 could incorporate one or more cameras oriented so as to capture imagery of the face of user 202. Similarly, the steering wheel of vehicle might incorporate heart rate or skin conductivity sensors. From this data, a mood for user 202 can be determined and used to select an appropriate soundscape. For example, if user 202 exhibits signs of stress and/or anger, then a soothing soundscape (for example, stand-up paddle boarding) can be selected. On the other hand, if user 202 exhibits signs of boredom or drowsiness, an exciting and engaging soundscape (for example, jet skiing) can be selected. The volume, frequency, and/or urgency of sound cues added to the soundscape can also be affected by this (or any other) source of data.

Similarly, traffic data 220 regarding the nearby traffic situation may be used to affect the soundscape. For example, in some localities, congestion and accident data are broadcast over AM or FM radio. This data can be decoded by an appropriate receiver and used (alone or in combination with route data from a route planner) to determine that congestion will be encountered during the current trip and select a more sedate soundscape. Alternatively or in addition, nearby vehicles may form a mesh network to communicate traffic (or other pathing information) with each other. This data can be used to determine traffic conditions (as described above) or to communicate other relevant information. For example, mood data from nearby vehicle may be transmitted and used to determine an appropriate soundscape and/or relevant sound cues. Thus, in addition to current ambient phenomena, embodiments of the invention may incorporate anticipated and/or predicted phenomena when creating the vehicular soundscape.

Similarly, data about (or from) other nearby vehicles can be used to predict upcoming maneuvers. For example, the adaptive cruise control system for a vehicle may include ultrasonic or radar sensors to detect nearby vehicles an automatically apply the brakes. By integrating with such a system, embodiments of the invention can anticipate braking before it occurs and incorporate a sound cue corresponding to the resulting acceleration. As another example, vehicles may communicate (e.g., via a vehicle-to-vehicle network) with other, nearby vehicles about traffic conditions. For example, if vehicle 204 receives such a communication indicating that traffic congestion ahead will require imminent braking, then an appropriate sound cue can be incorporated even before the braking occurs.

Figure 3:
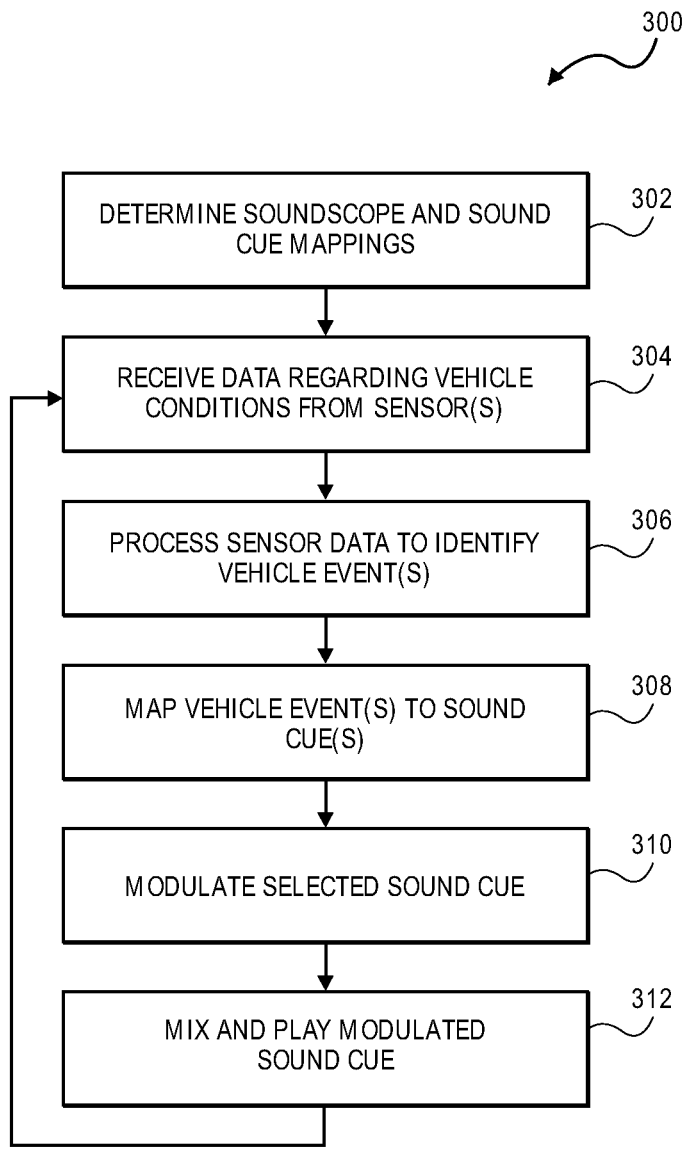
FIG. 3 depicts a flowchart illustrating the operating of a method in accordance with embodiments of the invention.

Turning now to FIG. 3, a flowchart illustrating the operation of a method in accordance with embodiments of the invention is depicted and referred to generally by reference numeral 300. Initially, at step 302, a soundscape and set of sound cue mappings is determined. As used herein, the term "soundscape" refers to the sounds present in a fantasy scenario (as opposed to sounds already present in the vicinity of vehicle 204). A soundscape may include background noise and/or one or more specific sound cues corresponding to events in the fantasy scenario. For example, a "paddle boarding" soundscape might include a background track of wind, waves, and other beach sounds. Sounds cues for the paddle boarding soundscape might include a water-swirl sound, a splashing sound, a cry from another beach-goer, and so forth. An alternative soundscape might include a motocross scenario with a background track of engine noise (either synthesized or piped in from the vehicle's actual engine), with sound cues including Doppler-shifted engine noises of other vehicles, tires squealing, and so forth. One of skill in the art will appreciate that any of a wide variety of soundscapes and sound cues in addition to those described above are possible for use with embodiments of the invention.

Broadly speaking, the soundscape may be determined based on a variety of factors. For example, a beach soundscape may be selected if weather information 216 indicates that the current conditions are sunny, while a rain forest soundscape may be selected if weather information 216 indicates that the current conditions are rainy. One of skill in the art will appreciate that any of the sensors described above can be used to determine a soundscape for a particular trip, as can any other data from sources internal or external to the vehicle. For example, the soundscape may be determined based on a mood of the user 202. In some embodiments, user 202 can specify a soundscape or override an automatically selected one.

Together with the soundscape, a set of corresponding sound cues mapped to vehicle events are determined. Vehicle events are discussed in greater detail below, but can broadly be any event related to the vehicle or taking place in the vicinity of the vehicle. Some or all vehicle events may have sound cues mapped to them. Soundscapes may include a predetermined set of mappings from vehicle events to the sound cues associated with the soundscape. For example, a "surfing" soundscape may map the sound of a surfer paddling to the vehicle event where vehicle 204 accelerates from a stop. Similarly, the vehicle event "driving normally at between 60 and 100 kilometers per hour" may be mapped to a sound cue of a rushing wave. User 202 may also change the mappings from vehicle events to sound cues to conform to their preferences, and new sound cues may be added to existing soundscapes.

Once the soundscape and sound cue mappings for the current vehicle scenario have been determined, processing can proceed to step 304, where data regarding the current vehicle conditions is received from one or more of the sensors associated with the system. For example, raw acceleration data may be received from accelerometers 210. Alternatively, the sensors may perform some preprocessing of data, such that (for example) a modulus of acceleration is received rather than a set of accelerations for each individual axis. Similarly, speed data may be received from an onboard computer or speedometer of vehicle 204 or by preprocessing successive updates from location-determining component 212.

Next, processing continues to step 306, where the sensor data is processed to identify one or more vehicle events. For example, the acceleration of the vehicle along the longitudinal axis (or the modulus of acceleration for the vehicle) may follow a classic "brake jerk" curve, which could be used to identify a "braking" vehicle event. Similarly, the speed data can be binned to identify the "driving normally at between 60 and 100 kilometers per hour" vehicle event described above, and a location received from location-determining component 212 entering a particular geo-fenced region could be used to identify an "approaching destination" vehicle event. Other examples of vehicle events that can be identified from sensor data include "gradual speed change," "sudden braking," "sudden acceleration," "region change," "sharp turn," "other vehicle nearby" "incident ahead" and "collision imminent." One of skill in the art will appreciate that these are only exemplary vehicle events and a wide variety of vehicle events are contemplated as being within the scope of the invention.

Once a vehicle event has been identified, processing can proceed to step 308, where the vehicle event is mapped to a corresponding sound cue based on the previously determined mapping. Some vehicle events may not be mapped to a sound cue. Other vehicle events may be mapped to multiple sound cues. Certain sets of sensor data may trigger multiple vehicle events simultaneously, each with an associated sound cue. In some embodiments, user 202 can dynamically adapt the mappings of vehicle events to sound cues while the trip is underway or remove sound cues from particular vehicle events.

Next, processing continues at step 310, where the selected sound cue is modulated and effects added by sequencer 208. In this step, the pitch, tempo, volume, and other properties of the sound cue may be altered based on the context of the sound cue. For example, in a "muscle car" soundscape, the actual sound cue may be sampled from the engine compartment of vehicle 204, but pitch-shifted downward and increased in volume to achieve a more muscular sound. Alternatively, a paddling sound cue in a paddle board soundscape can be increased or decreased in tempo based on a modulus of acceleration for vehicle 204. In some embodiments, short sound cues may be used and looped as long as needed (e.g., as long as the vehicle condition lasts). Other effects can also be added to the sound cue as needed to place it appropriately in the context of the soundscape.

Processing can then proceed to step 312 for mixing. As described above, in some embodiments, multiple sound cues may be played at the same time. Additionally, the soundscapes may include background tracks of sound and/or music. Accordingly, in some embodiments, multiple channels (for example, three sound-cue channels and two background channels) may be mixed together by the sequencer as well. In some embodiments, this combined channel is played over a dedicated sound system 206. In other embodiments, this combined channel is instead played over the conventional sound system of vehicle 204. In such embodiments, the combined channel may be further mixed with the sound being played over the conventional sound system or sequencer 208 may be integrated into the conventional sound system such that all audio is mixed in a single step. Finally, the audio is played over sound system 206, and processing can return to step 304, where additional sensor data is processed to identify additional vehicle events mapped to additional sound cues.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A system for providing contextual enhancement of audio in a vehicle, comprising:
   one or more vehicle sensors configured to provide sensor data relevant to the vehicle;
   a processor;
   one or more computer-storage media storing computer-executable instructions that, when executed by the processor, perform steps of:
     determining a vehicle event based on the sensor data, wherein the vehicle event is the approach of a vehicle to a destination location;
     determining a sound cue based on the vehicle event and a mapping of a plurality of vehicle events to a corresponding plurality of sound cues;
     applying a modulation to the sound cue based on the sensor data;
   an in-vehicle sound system, programmed to:
     mix the modulated sound cue into a background track; and
     play the mixed background track over in-vehicle speakers.

2. The system of claim 1, wherein the one or more sensors include an accelerometer.

3. The system of claim 1, wherein the one or more sensors include a location-determining component.

4. The system of claim 1 wherein the step of modulation includes changing the tempo of the sound cue.

5. The system of claim 1 wherein the step of modulation includes changing the pitch of the sound cue.

6. The system of claim 1, wherein the computer-executable instructions further cause the processor to perform a step of applying a loop effect to the sound cue.

7. The system of claim 1, wherein the vehicle event further includes a braking event.

8. One or more non-transitory computer-storage media storing computer-executable instructions that, when executed by a processor, perform a method of providing contextual enhancement of audio in a vehicle, the method comprising the steps of:
   determining a soundscape of a plurality of available soundscapes;
   receiving, from a vehicle sensor, sensor data;
   determining a vehicle event based on the sensor data;
   determining a sound cue based on the vehicle event and the determined soundscape;
   modulating the sound cue based on the sensor data; and
   mixing the modulated sound cue into the determined soundscape for playback.

9. The media of claim 8, wherein the determined soundscape is a beach soundscape.

10. The media of claim 8, wherein the determined soundscape is a muscle car soundscape.

11. The media of claim 8, wherein the determined soundscape is automatically determined based on the ambient weather.

12. The media of claim 8, wherein the vehicle event relates to a nearby vehicle.

13. The media of claim 8, wherein the vehicle sensor monitors a mood of the driver.

14. The media of claim 8, wherein the vehicle sensor measures local traffic.

15. A method of providing contextual enhancement of audio in a vehicle comprising the steps of:
   receiving, from a user, a selection of a soundscape of a plurality of soundscapes;
   receiving, from the user, an indication of a mapping from a vehicle event of a plurality of vehicle events to a sound cue of a plurality of sound cues,
   wherein the vehicle event is the approach of a vehicle to a destination location;
   playing a background track of the soundscape on a sound system in the vehicle;
   receiving, from a vehicle sensor of the vehicle, sensor data;
   determining, based on the sensor data, that the vehicle event has occurred or is occurring;
   modulating the sound cue based on the sensor data; and
   mixing the modulated sound cue into the background track of the soundscape.

16. The method of claim 15, wherein the vehicle sensor measures local weather.

17. The method of claim 15, wherein the vehicle sensor measures vehicle speed.

18. The method of claim 15, wherein the selected soundscape is a jet skiing soundscape.

19. The method of claim 15, wherein the modulation involves changing the volume of the sound cue.

* * * * *